US010380020B2

(12) United States Patent
Ambroladze et al.

(10) Patent No.: US 10,380,020 B2
(45) Date of Patent: Aug. 13, 2019

(54) ACHIEVING HIGH BANDWIDTH ON ORDERED DIRECT MEMORY ACCESS WRITE STREAM INTO A PROCESSOR CACHE

(71) Applicant: International Business Machines Corporation, Armonk, NY (US)

(72) Inventors: Ekaterina M. Ambroladze, Los Angeles, CA (US); Timothy C. Bronson, Round Rock, TX (US); Matthias Klein, Wappingers Falls, NY (US); Pak-kin Mak, Poughkeepsie, NY (US); Vesselina K. Papazova, Highland, NY (US); Robert J. Sonnelitter, III, Wappingers Falls, NY (US); Lahiruka S. Winter, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/651,543

(22) Filed: Jul. 17, 2017

(65) Prior Publication Data

US 2019/0018775 A1    Jan. 17, 2019

(51) Int. Cl.
*G06F 13/16* (2006.01)
*G06F 12/0831* (2016.01)

(52) U.S. Cl.
CPC ...... *G06F 12/0831* (2013.01); *G06F 13/1615* (2013.01); *G06F 2212/60* (2013.01); *G06F 2212/621* (2013.01)

(58) Field of Classification Search
CPC combination set(s) only.
See application file for complete search history.

(56) References Cited

U.S. PATENT DOCUMENTS

| 6,539,457 | B1 | 3/2003 | Mulla et al. |
| 2003/0005229 | A1 | 1/2003 | Rangan |
| 2010/0268882 | A1 | 10/2010 | Cargnoni et al. |
| 2016/0103681 | A1 | 4/2016 | Alexander et al. |
| 2016/0217077 | A1* | 7/2016 | Ambroladze ....... G06F 12/0855 |

OTHER PUBLICATIONS

Pat Conway, et al.; Cache Hierarchy and Memory Subsystem of the AMD Opteron Processor; IEEE Computer Society, 2010, pp. 16-29.

* cited by examiner

*Primary Examiner* — Yong J Choe
(74) *Attorney, Agent, or Firm* — Cantor Colburn LLP; William Kinnaman

(57) ABSTRACT

Embodiments include methods, systems and computer program products method for maintaining ordered memory access with parallel access data streams associated with a distributed shared memory system. The computer-implemented method includes performing, by a first cache, a key check, the key check being associated with a first ordered data store. A first memory node signals that the first memory node is ready to begin pipelining of a second ordered data store into the first memory node to an input/output (I/O) controller. A second cache returns a key response to the first cache indicating that the pipelining of the second ordered data store can proceed. The first memory node sends a ready signal indicating that the first memory node is ready to continue pipelining of the second ordered data store into the first memory node to the I/O controller, wherein the ready signal is triggered by receipt of the key response.

17 Claims, 3 Drawing Sheets

ACHIEVING HIGH BANDWIDTH ON ORDERED DIRECT MEMORY ACCESS WRITE STREAM INTO A PROCESSOR CACHE

BACKGROUND

The present invention relates in general to data communication using parallel access data streams, and more specifically, to methods, systems and computer program products for parallel access data stream communication in distributed shared memory systems having a variable latency.

A central processing unit (CPU) cache is a cache used by a computer CPU to reduce the average time to access data from main memory. A cache is memory, smaller and faster than main memory, which stores copies of data from frequently used main memory locations. A cache is often organized as a hierarchy of cache levels such as a level 1 cache (L1), a level 2 cache (L2), a level 3 cache (L3) and so on. When the CPU needs to access a location in main memory, the CPU first checks whether a copy of that data is in the cache. If the data exist in the cache, the processor reads from or writes to the cache, which is faster than reading from or writing to main memory.

Each cache holding data associated with a location in main memory presents a potential data coherency problem. For example, the relevant data in main memory may be changed by other entities (for example, by peripherals using DMA (direct memory access) or by any of the various cores in a multi-core processor), in which case the copy in the cache(s) may become stale (out-of-date). Alternatively, when a CPU in a multiprocessor system updates data in an associated cache, copies of that data in caches associated with other CPUs become stale.

SUMMARY

Embodiments of the invention are directed to a method for maintaining ordered memory access with parallel access data streams associated with a distributed shared memory system. A non-limiting example of the computer-implemented method includes performing, by a first cache, a key check, the key check being associated with a first ordered data store. A first memory node signals that the first memory node is ready to begin pipelining of a second ordered data store into the first memory node to an input/output (I/O) controller. A second cache returns a key response to the first cache indicating that the pipelining of the second ordered data store can proceed. The first memory node sends a ready signal indicating that the first memory node is ready to continue pipelining of the second ordered data store into the first memory node to the I/O controller, wherein the ready signal is triggered by receipt of the key response.

Embodiments of the invention are directed to a computer program product that can include a storage medium readable by a processing circuit that can store instructions for execution by the processing circuit for performing a method for maintaining ordered memory access with parallel access data streams associated with a distributed shared memory system. The method includes performing a key check, the key check being associated with a first ordered data store. The method further includes signaling that a first memory node is ready to begin pipelining of a second ordered data store into the first memory node to an input/output (I/O) controller. The method further includes returning a key response to a first cache indicating that the pipelining of the second ordered data store can proceed. The method further includes sending a ready signal indicating that the first memory node is ready to continue pipelining of the second ordered data store into the first memory node to the I/O controller, wherein the ready signal is triggered by receipt of the key response.

Embodiments of the invention are directed to a system for maintaining ordered memory access with parallel access data streams associated with a distributed shared memory system. The system can include one or more nodes, one or more input/output controllers and one or more fabrics. The system can be configured to perform a key check, the key check being associated with a first ordered data store. The system can be configured to signal that a first memory node is ready to begin pipelining of a second ordered data store into the first memory node to an input/output (I/O) controller. The system can be configured to return a key response to the first cache indicating that the pipelining of the second ordered data store can proceed. The system can be configured to send a ready signal indicating that the first memory node is ready to continue pipelining of the second ordered data store into the first memory node to the I/O controller, wherein the ready signal is triggered by receipt of the key response.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

Figure 1:
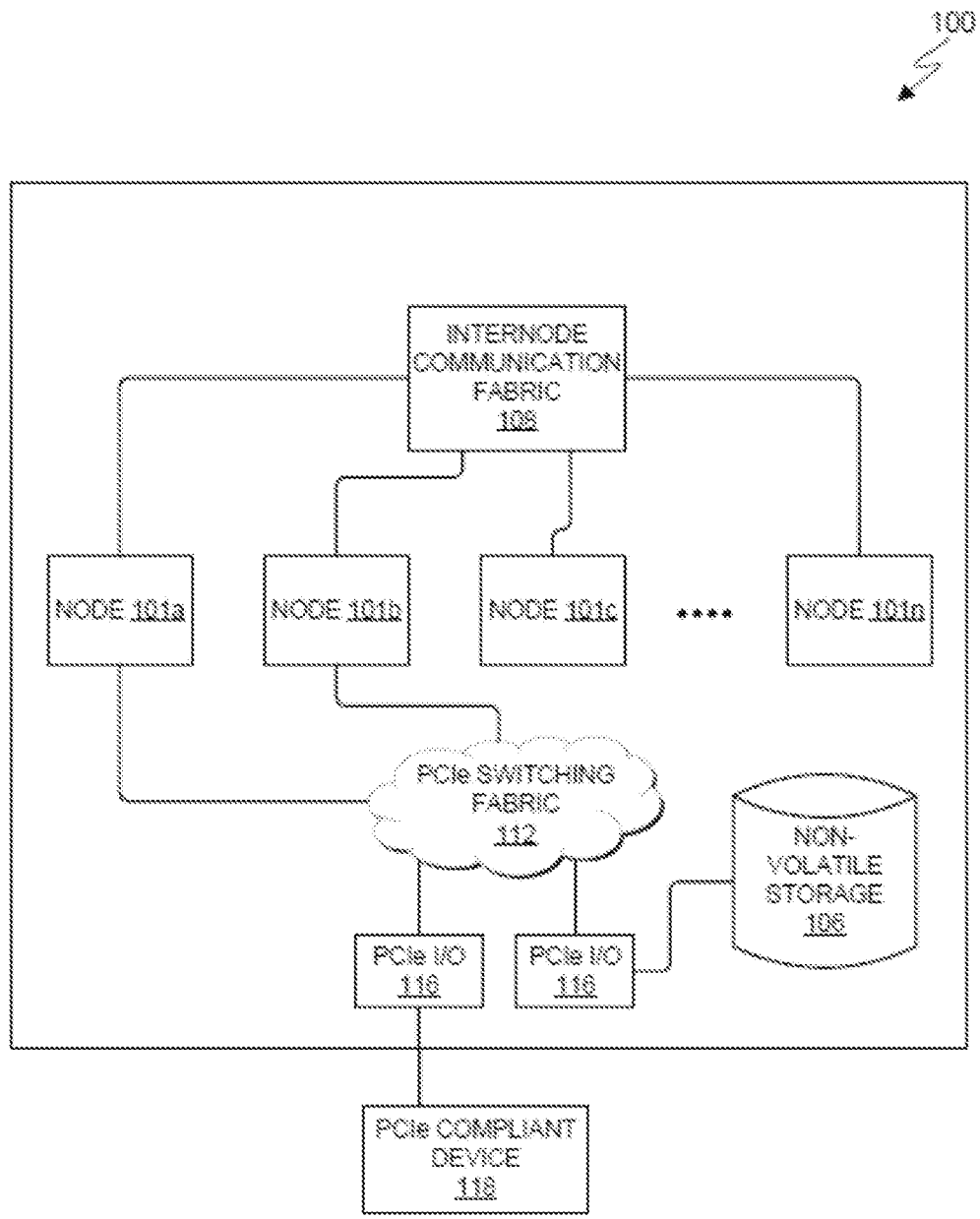
FIG. 1 depicts a block diagram of a computing system according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In order to meet higher bandwidth of peripheral component interconnect express (PCIe) traffic between input/output (TO) ports and processor-memory subsystem (16 gigabit and higher), a parallel processing of the operations is needed. Obtaining coherency for a single line in a complex system architecture that could include over 100 cores spread across multiple drawers having multiple levels of shared and private data caches presents a big challenge in achieving high throughput for ordered stores. While obtaining coherency proves to be time consuming, performing the actual data store takes time and is therefore also time consuming. When executing an ordered store there can be a significant challenge in meeting PCI bandwidth requirements, especially in the case when the data resides in a remote cache.

Turning now to an overview of technologies that are more specifically relevant to aspects of the invention, embodiments of the invention are related in general to improving overlapping on ordered stores for large scale computing. The proposed overlapping of ordered stores improves ordered store (DMA Write) bandwidth in consideration of potentially encountering of an address conflict.

To achieve the improvement of the overlapping on ordered stores for large scale computing, the present invention can use a receipt of key response to trigger a next ordered store. Using the receipt of the key response to trigger the next order store instead on completion of a previous store as a trigger decreases the time between ordered store operations.

A distributed shared memory system is a system in which a single memory space can be spread over multiple physical locations. All processors associated with the distributed shared memory system can access the single (shared) memory space. Some distributed memory systems are used in combination with one or more data communication subsystems and/or techniques, such as PCIe (peripheral component interconnect express), that use parallel access data streams. A parallel access data stream is any one of multiple data streams coming from one or more physical and/or virtual channels that can be in process simultaneously. Each data stream is made up of stores for which a proper sequence must be maintained ("ordered stores"). The descriptions herein are with respect to any one of these data streams.

Typically, distributed shared memory systems exhibit a variable latency. Latency is a delay between a request for access to a memory location and the granting of the access. An example of a variable latency system is a conventional mainframe system, which supports a fully coherent memory with a single memory address space. The memory address space may be shared by many processor cores spread across a non-trivial physical space with multiple levels of caches supporting these cores. Servicing memory access requests ensures that the correct data is accessed without conflict, regardless of the physical location(s) in the memory system where that address is currently being maintained.

Some embodiments of the present invention may include one, or more, of the following features, characteristics and/or advantages: (i) support for high data bandwidth PCIe traffic between I/O (input/output) ports and system memory; (ii) support for industry standard interfaces, such as ×8 and ×16 Gen-3 PCIe; (iii) support for communication interfaces that expect stores to appear in memory (to application programs) in the order sent; (iv) compatibility with industry standard PCIe devices; and/or (v) support for approximately 7 GB/s (Gigabyte/second) or greater of store data (the net data capacity of an 8 times. Gen-3 PCIe bus after subtracting command and control overhead on the 8 GB/s combined command and data interface), written to memory in order.

Some embodiments of the present invention recognize the following facts, potential problems and/or potential areas for improvement with respect to the current state of the art: (i) support for high data bandwidth PCIe traffic between I/O and system memory may be difficult to achieve in some systems due to complex system structure (for example, systems having a fully coherent memory with a single address space shared by up to 192 cores and memory spread across 8 nodes in 4 drawers, with multiple levels of shared and private data caches, sliced into independently operating units by address for parallelism and maximum system throughput, where data may be held in various shared or exclusive states in any of the caches, depending on prior system activity); (ii) in such systems, executing memory writes in order may be difficult, for example because access time may depend on the system state, and location and ownership of the address to be stored; (iii) I/O may be attached to the memory subsystem through an L3 (level 3) cache, having, for example, a 256 byte line size; (iv) if ordered stores are executed in serial fashion, wherein a second data store cannot start until after a first data store has fully completed, the store bandwidth can be significantly slower than desired and/or required by operating specifications; (v) alternatively, if multiple ordered stores are launched in parallel, without further interlocks, it cannot be guaranteed that the stores will complete in the correct order; (vi) implementing interlocks may be complicated by multiple independent slices and pipelines in the system; and/or (vii) using the moment coherency is obtained (rather than final completion of a store) as the time when the next ordered store can begin allows a faster rate of execution than fully serializing stores, but does not provide sufficient ordered write bandwidth to satisfy operating requirements in all cases of practical interest, such as with PCIe interfaces to complex distributed shared memory systems.

A fully coherent memory requires obtaining coherency on each line stored to guarantee memory consistency and coherency visible to all processors and I/O interfaces. Obtaining coherency can entail: (i) querying one or more cache directories to locate the closest copy of data where the store can be performed while maintaining coherency (in other words, locating the primary copy of the data); (ii) obtaining exclusive ownership of the data for the I/O store; and (iii) reserving certain hardware resources necessary to complete the store. The time needed to obtain coherency depends on the state of local and other directories, and the system capacity. Some systems may represent small single-drawer configurations or larger multi-drawer configurations, with some systems having more caches and/or more interconnections to be searched than others.

Some embodiments of the present invention recognize: (i) that in some conventional systems, the time needed to obtain coherency may be around 60 ns (nanoseconds) in a single node system configuration and over 25% longer in a multi-node system configuration, while the time needed to fully complete a store is longer still; (ii) to meet the PCIe required net minimum of 7 GB/s, a new store (of a 256-byte line) must be launched every 36.6 ns or sooner; and/or (iii) if ordered stores are executed in serial fashion, wherein a second data store cannot start until after a first data store has fully completed, the store bandwidth will be significantly less than the 7 GB/s required.

Some embodiments of the present invention recognize that: (i) an I/O controller may be, for example a PCIe bridge unit (PBU) which includes a PCIe bridge controller (PBC) and a PCIe root complex as internal sub-units; (ii) the last point where stores remain in a single stream, and therefore where coordination between successive ordered stores is convenient, is in the I/O controller; and/or (iii) it is therefore desirable to control order from the I/O controller.

Some embodiments of the present invention allow a second data store to begin before full coherency of the first data store is obtained. Level 4 caches (L4) and a system fabric across the system are treated as a pipelined resource, wherein a command begins at a local L3, then proceeds to the local L4, then across the system fabric to other L4 and L3 caches, each L3 possibly (depending on its directory contents) also searching the L2, and possibly L1 caches on one or more of its attached processors.

Pipelined resource refers to separate processing steps at each unit the store passes through. As processing moves on to the next stage, the preceding stage is free to work on the next instruction, so that across the system, there may be multiple instructions in process at the same time, at different locations within the system in which each of the multiple instructions can exists at a different stage of completion. It may help the reader to visualize an assembly line, where item A has component X added at station 1, then, when item A moves on to station 2 to have component Y added, item B is at station 1 getting component X added, and so on. In the context of the present disclosure, there may also be multiple pipelines simultaneously working on different storage streams. These pipelines may be processing through the same physical structures at the same time, as long as there are sufficient resources in those structures to support the operations of each pipeline. For example, the same physical L3 or L4 "structure" may contain separate physical components per pipe or slice for most of the stages of each pipeline, although some of the interconnections from one stage to the next (such as the bus connection between L3 and L4) may be shared between pipes and slices.

In some embodiments, caches are divided into slices and maintaining order across independently operating slices is needed. For example, there may be one slice to handle all the even addresses and another slice to handle all the odd addresses. Each slice may be a separate set of hardware having all the parts required to complete all the processing steps for a memory operation. Having multiple slices allows more throughput, since each slice can contain an independent set of instructions in process, with different instructions processing in the other slice(s) simultaneously.

Obtaining system-wide coherency includes searching all affected caches. In a case where an I/O store will miss in the cache, and go to memory, this searching includes the local L3 cache, and L4 cache on all nodes. Obtaining a response from the furthest L4 cache generally determines a coherency time.

In some embodiments of the present invention: (i) resources, including command and data buffers, are reserved, for the first data store, in the local L3 only (closest stage in the fabric "pipeline"); and/or (ii) the command is forwarded to the attached L4 for further coherency checking related to the first data store and (iii) conducting early key checking. Further, after completion of items (i), (ii) and (iii) associated with the first data store and receiving a key response (KRESP) indicating that it is safe to conduct another ordered store, the PBC can send a second data store to L3.

Thus, the first data store remains in order, with respect to other ordered stores that may subsequently launch onto the fabric, without direct interlocks between the stores. The PBC has visibility to the complete ordered store command stream and can launch each of the stores into its address-appropriate slice. In the event of a conflict in any of the L4s, the store is rejected back to the PBC and restarted, thus preventing a first data store from falling behind a subsequent store. In the event of such a reject, the PBC identifies and cancels all subsequent stores in the stream that have been launched into L3, even if they have been launched into different slices. The entire ordered stream can be restarted thereby maintaining the correct order.

FIG. 1 depicts a functional block diagram illustrating various subsystems of computer system 100, including: nodes 101a through 101n (collectively nodes 101); inter-node communication fabric 108; PCIe switching fabric 112; non-volatile storage 106; PCIe compliant device 118; and PCIe I/O adapters 116.

Internode communication fabric 108 facilitates communication among nodes, for example, nodes 101a through 101d, or some portion thereof (hereinafter nodes 101). PCIe switching fabric 112 enables communication between I/O adapters 116 and nodes 101. In various alternative embodiments, each node 101 may or may not be operationally coupled with non-volatile storage 106, and each node 101 may or may not be operationally coupled with PCIe switching fabric 112. PCIe compliant device 118 communicates with nodes 101 through one of I/O adapters 116 and PCIe switching fabric 112.

Internode communication fabric 108 provides communications between various components of computer system 100, and in particular, between the various nodes 101. The internode communications fabric 108 can be implemented using any architecture designed for passing data and/or control information between processors (such as microprocessors, communications and network processors, etc.), system memory, peripheral devices, and any other hardware components within a system. For example, the internode communications fabric 108 can be implemented, at least in part, with one or more buses.

Non-volatile storage 106 can be a computer-readable storage media. In general, non-volatile storage 106 can include any suitable non-volatile computer-readable storage media. It is further noted that, now and/or in the future: (i) external device(s) may be able to supply, some or all, memory for non-volatile storage 106; and/or (ii) devices external to computer system 100 may be able to provide memory for non-volatile storage 106.

Figure 2:
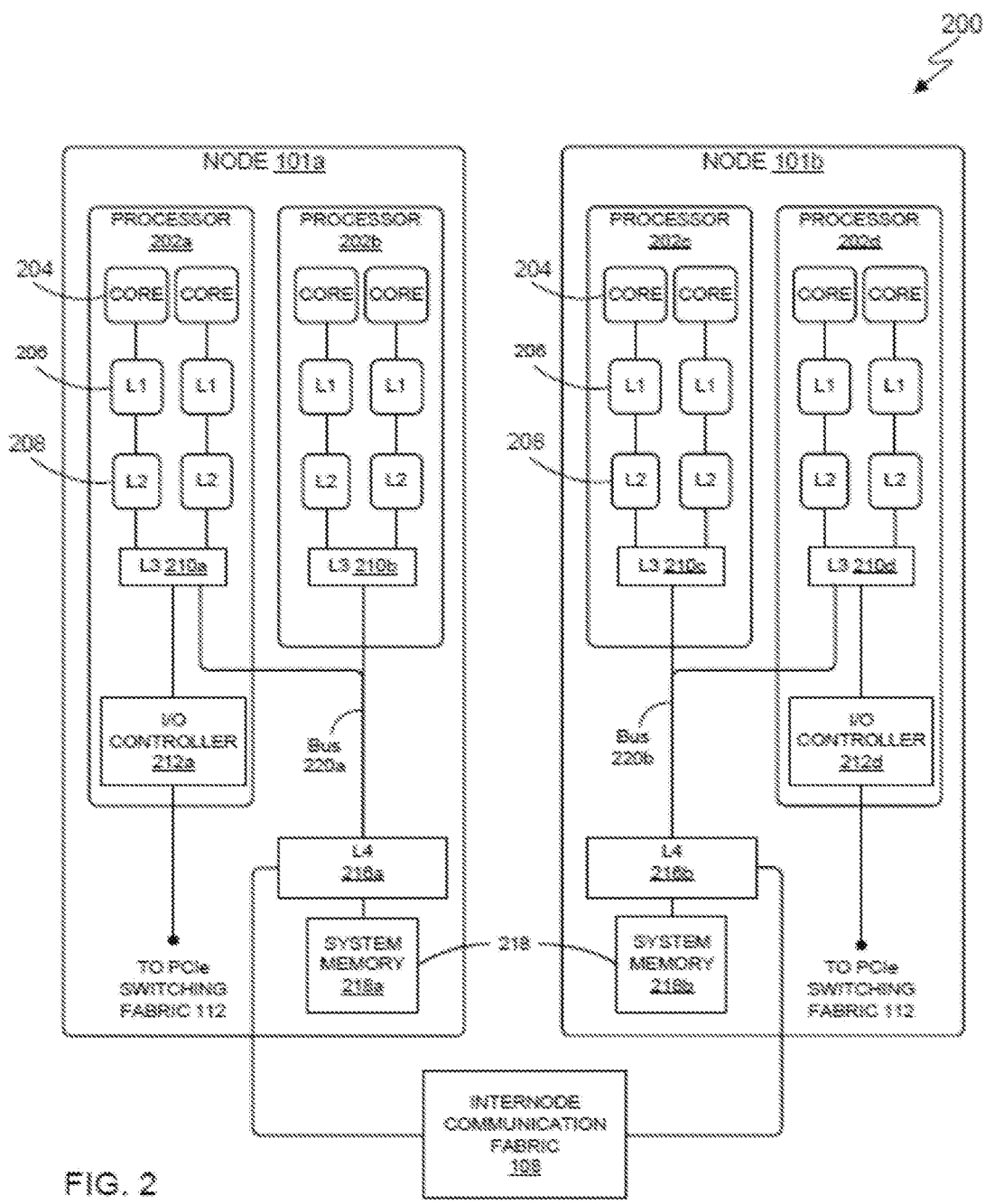
FIG. 2 depicts a block diagram of a portion of the computing system according to one or more embodiments of the present invention.

FIG. 2 depicts a functional block diagram 200 illustrating various subsystems of nodes 101, and internode communication fabric 108, including processors 202a through 202d (collectively processors 202), where each processor 202 includes one or more of cores 204, level 1 caches (L1) 206, level 2 caches (L2) 208, and level 3 caches (L3) 210a through 210d (collectively L3 210). Nodes 101 further include: bus 220a and bus 220b (with respect to node 101a, bus 220a can be a local bus and bus 220b can be a remote bus, whereas with respect to node 101b, bus 220b can be a local bus and bus 220a can be a remote bus); I/O controllers 212a and 212d (collectively I/O controllers 212); L4 (level 4 caches) 216a and 216b (collectively L4 216); and system memory 218a and 218b (collectively system memory 218). In this embodiment, I/O controllers 212 are PCIe bridge units (PBUs) each of which includes a PCIe bridge controller (PBC). Each L3 and each L4 can be associated with at least one controller (not shown), which can be a set of registers and associated logic making up a finite state machine that controls and tracks the progress of a command processing through that cache. Communications among nodes 101 can be facilitated by the internode communication fabric 108.

It is noted here that the architecture illustrated in the embodiment of FIG. 2 is not limiting. There are numerous alternative embodiments that do not depart from the spirit of the present invention. For example, some embodiments can have any number of nodes 101, and a node can have any number of processors 202. Some processors 202 may have no L3 210 while others may have one or more. Similarly, processors 202 may have any number of cores 204. Cores may have L1 206 and L2 208 caches, of various sizes and configurations. Other embodiments are configured with any number of I/O controllers 212a, each of which may be a PCIe I/O controller, a non-PCIe I/O controller, or an I/O controller capable of handling both PCIe and non-PCIe communications. Each L3 210 may or may not be coupled with an I/O controller 212, and alternatively, each I/O controller 212 may be coupled with one or more L3 210, and/or may be coupled directly to a different cache/memory level.

System memory 218 can be configured as a single memory address space notwithstanding that physical devices comprising system memory 218 may be numerous, distributed and/or non-homogeneous. In some embodiments, L4 216 may be interposed between system memory and lower-level caches. In some embodiments, the physical devices comprising system memory are configured as a RAID (redundant array of independent disks)-style memory system. Multiple storage controllers (not pictured) may be present on any or all given nodes 101, and a unitary L4 216 may be split between or among them. A single I/O controller 212 may be connected to several "copies" of L3 210 and/or several copies of L4 216, where the copies may be selected (sliced) by address as discussed previously, with each copy independently following the processing steps discussed below with minimal connection to the other copies due to the distance between them (for instance, one slice may be built on the left side of a chip, while another slice may be built on the right side of the chip; much communication between the slices on command progress is not practical due to the physical distance between them).

In some alternative embodiments: (i) the physical structure differs from the logical structure to accommodate physical package limitations; (ii) the storage hierarchy can be L1-L2-L3-L4-system memory-non-volatile storage, but the memory controller can be physically connected to L3, and the non-volatile storage can also be connected to L3, via an I/O controller; (iii) L4 can be connected to each processor via separate point-to-point connections; (iv) a separate storage controller can reside inside each processor chip attached to the L3 in that processor chip, and a separate system memory block attached to each storage controller (the memory can be in the node but outside the processor chip); (v) the I/O controller may be inside or outside each processor chip; (vi) each node contains 3 processor chips, and each processor chip can contain 8 cores, 8 L1, 8 L2, 1 L3, 2 PCIe I/O controllers, and 1 storage controller; (vii) L4 can reside in a separate system controller chip, for which there can be one per node; (viii) the system memory can include separate components (for example, 5 memory DIMMs per processor chip and memory controller) within each node; and/or (ix) there may be up to 8 nodes, packaged in up to 4 drawers in which nodes within an associated drawer are communicatively coupled.

In some embodiments of the present invention, distributed shared caches (for example, L2 208, L3 210, and/or L4 216, with one or more instances of each cache distributed across the system and sharing the same address space) allow multiple copies of data to exist in more than one place. When multiple copies of data exist in a distributed shared cache, one copy, designated an intervention master (IM), can be returned to a processor 202 in response to requests for the data, or returned to another cache within the system. The cache lines that are not designated IM do not provide a copy. This prevents multiple copies of the data from being returned to the requestor.

In some embodiments, the IM state can be associated with a particular line in the cache. The IM state identifies the cache that most recently obtained the data. If the line is requested by a cache that does not already have that line, the previous IM transfers the data to the requesting cache, and the requesting cache might be designated the new IM for that line. Accordingly, the cache that was previously designated as the IM will relinquish an IM status but may still retain a copy of the data.

Figure 3:
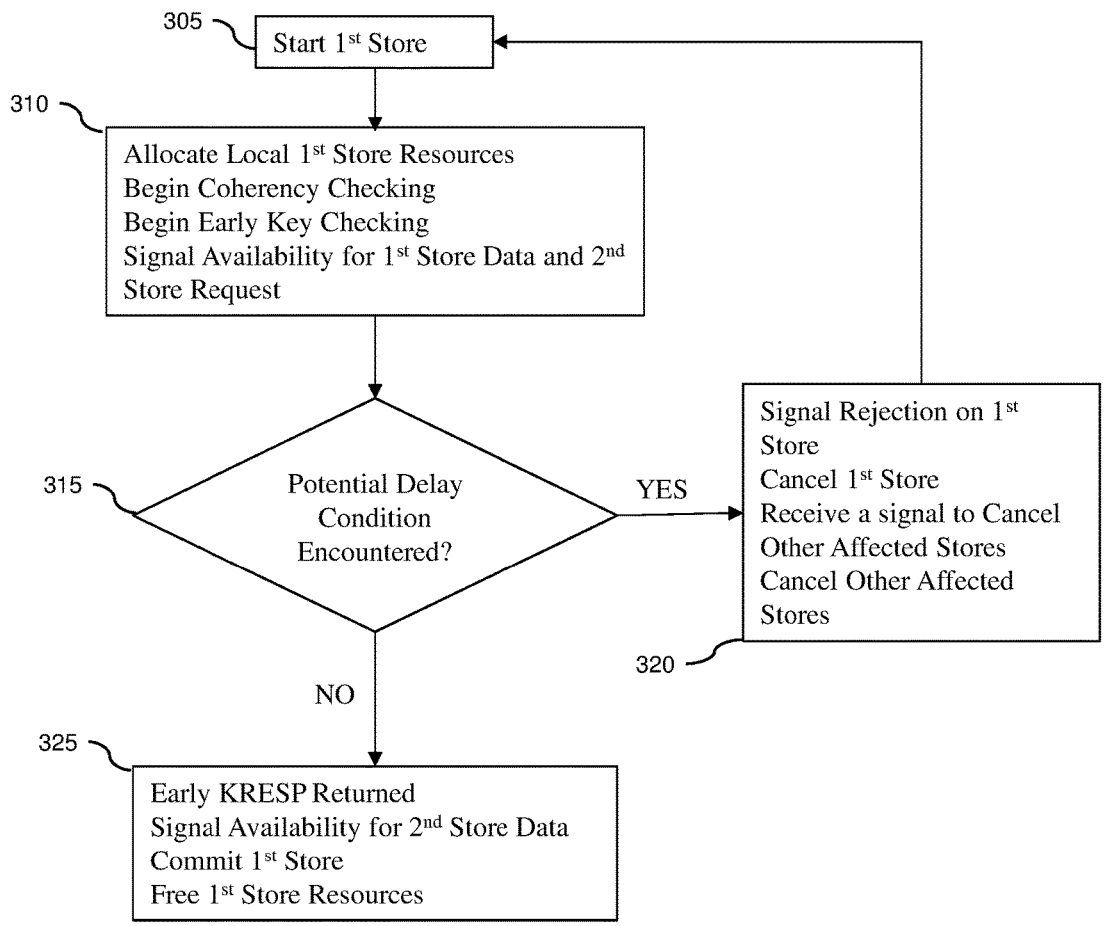
FIG. 3 is a flow diagram of a method for maintaining ordered memory access with parallel access data streams associated with a distributed shared memory system according to one or more embodiments of the present invention.

Referring to FIG. 3, a flow diagram of a method 300 for maintaining ordered memory access with parallel access data streams associated with a distributed shared memory system in accordance with an exemplary and non-limiting embodiment is depicted. At block 305, a L3 210a receives a first IOCS (I/O conditional store) request, for a first data store, from I/O controller 212a.

In some embodiments, a data stream can be a series of data packets from the same originator. An originator may be, for example, an I/O adapter such as one of I/O 116 of FIG. 1. Where references are made to a first data store or a second data store, the first data store and the second data store can be from the same data stream. As an alternative example, an originator may be a virtual I/O adapter. In some embodiments, a data packet can be identified by a five-bit NID (node identifier) encoded within the data packet such that data packets originating from the same originator are guaranteed to have the same NID and therefore are identifiable as being members of the same data stream. Multiple data streams may be processed by each I/O controller 212, in any order, and no ordering requirement exists for stores of one data stream relative to stores from another data stream. However, stores from any single data stream (that is, stores having the same NID) should be accomplished in the correct order to preserve the integrity of the data stream. The correct order can be determined by the order in which the data packets arrive at an I/O controller 212. Stores for each NID are considered a data stream of related stores that are to be processed in order with respect to each other. Stores from different NIDs are considered independent data streams that may be processed independently (that is, at the same time, in parallel), and are one example of "parallel access data streams."

The I/O controller 212 can accept PCIe-type communications and can be a physical controller. The I/O controller 212 may also be a virtual controller. A request may be received by a different component of the memory node, such as an L4 cache or a memory controller chip without a cache.

At block 310, in response to receiving the first IOCS request, the L3 210a can (i) forward the IOCS request to L4 216a and if L4 216a does not have exclusive ownership of the line, broadcast the request to other nodes using a system fabric, for example, internode communication fabric 108; (ii) allocate local resources in preparation for processing the first data store; (iii) launch a coherency checking process; (iv) begin an early key check, which is a comparison of a key that has been provided by a requesting device along with the first IOCS with a page key associated with a memory page line; (v) signal an availability to accept the data associated with the first data store and (vi) signal an availability to accept a second IOCS request for a second data store. Note that, in some embodiments, these signals may be combined, for example, the signal for availability to accept a second IOCS request may be implicit in the signal for accepting the data associated with the first data store.

The coherency checking process launched at block 310 treats all L4 216 caches and system fabric, across the system, as a pipelined resource, wherein a command can be received by a local L3 (such as L3 210a), which can be sent to other local L3s (210b) and the local L4 (216a), then across the system fabric to one or more remote L4s (216b) and associated L3s (210c through 210d). Each L3 (210a through 210d), depending on directory contents, may also search local L2 208 and L1 206 caches on one or more associated processors.

A remote L4 216b determined to have a highest point of coherency can ensure that all on-drawer processors relinquish ownership of an associated line while in parallel performing a key check. The remote L4 216b can also ensure that receipt of a latest copy of the data in case of exclusive ownership of the line by a processor on that drawer.

The drawer associated with the local L4 216a can receive one or more partial responses from the system fabric and can generate a combined response (CRESP). If the CRESP indicates that the line hits in the drawer associated with the remote L4 216b and the remote L4 216b is also an Intervention master (IM) for the line the local L4 216a can issue a hit response (HRESP) back to L3 210a. If a hit does not occur, the local L4 216a can issue a miss response (MRESP).

The signal of an availability to accept the first data store can be sent after (i) obtaining coherency on L3 210a (making sure no other operations are working on that address space in the L3 216a by checking addresses of active processes that have established coherency prior to the first data store arriving at the L3 216a); and (ii) allocating store controller and buffer resources, also known as LSAR (line store address register and associated state machine, not shown).

Processing proceeds to block 315, where, during the coherency checking process, a potential delay condition may be encountered. Potential delay conditions can include: (i) another controller (that is, a set of registers and associated logic making up a finite state machine that controls and tracks the progress of a command) processing the same line (for example, the line is locked because a command being processed by another controller, whether on the local node or a remote node, involves the same memory address or a memory address that is part of the same 256-byte cache line); and/or (ii) a directory state (such as a directory miss, or an indication that there is another copy of the line on a remote node) indicates a global fabric broadcast is required and there are insufficient L4 resources (that is, a controller on the local node and a controller on each of the remote nodes) available to initiate a global fabric broadcast. Note that these conditions are not necessarily due to a cache coherency conflict, but rather are concerned with the more general ability of the system to process the request in a timely fashion. Concurrently, or in sufficiently close temporal proximity with the coherency checking process, the L3 210a, having signaled availability to accept data for the first data store, can receive that data before committing to complete the first data store.

If a delay condition is encountered for the first data store ("Yes" at block 315) by a system component at any stage of the pipeline (such as the originating L3 cache 210a, a different local L3 210b or system fabric, a memory controller from a remote node, and so forth), processing proceeds to block 320, where L3 210a: (i) signals a rejection of the first IOCS request; (ii) cancels operations associated with the first data store; and/or (iii) releases any resources that have been reserved for the first data store. As a consequence, L3 210a may also receive one or more signals from I/O controller 212a, each signal to cancel a store subsequent to the first data store that can be part of the same data stream associated with the first data store.

If L3 210a receives one or more cancelation requests, L3 210a (i) cancels activities associated with the corresponding IOCS requests; and (ii) sends to I/O controller 212a, a "cancelation complete" signal for each cancelation that is processed. Alternatively, no "cancelation complete" signal is sent, and/or the system 100 temporarily holds or continues to try to obtain resources for the one or more canceled stores in anticipation of a reissue of the rejected store request(s) by the requester. If the rejected store request(s) are reissued by I/O controller 212a, processing returns to block 305, where the request(s) are re-attempted following the same process described herein. In some embodiments of the present invention, the I/O controller 212a can reissue the same stores at a slower rate that does not require rejection due to processing delay. This approach can avoid repeatedly canceling the same set of stores should the first data store of the stream again encounter a delay.

If a delay condition is not encountered for the first data store ("No" at block 315), processing proceeds to block 325 where L3 210a (i) forwards a response for the early key check (KRESP) to the I/O controller 212a; (ii) signals an availability to accept the data associated with the second data store; (iii) commits to completing the first data store; and (iv) frees resources reserved for the first data store after completing the first data store.

At block 325, after invalidating all copies of the line in L3 210a, acquiring a latest copy of the line from the remote L4 216b. In addition, having the IM launch the coherency checking process and check the key for a drawer associated with the IM prior to determining a delay condition can cause the remote L4 216b to send an early KRESP for the first data store request back to a requesting drawer. Upon arrival of the KRESP at the requesting drawer, the L4 216a can forward data associated with the first data store to the drawer that will store the data associated with the first data store. The drawer can forward the KRESP to the L3 210a after receiving a fabric indication that processors associated with all other drawers have given up ownership of the line. The L3 210a can forward the KRESP to the I/O controller 212a, which triggers a next ordered store operation that can send the data associated with the second data store to L3 210a.

Once L3 210a receives the data associated with the first data store from the I/O controller 212a and the HRESP, the L3 210a can forward the data associated with the first data store to the L4 216a. A requesting drawer associated with the L4 216a can wait for all drawers other than the IM drawer to invalidate an associated copy of the line and forwards the data associated with the first data store to the IM drawer. The IM drawer can perform the first data store operation in L4 216a and send a final response (FRESP) back to the requesting drawer. The L4 216a associated with the requesting drawer can forward the FRESP to the L3 210a. The L3 210a can return the FRESP to the I/O controller 212a to indicate a successful store.

Accordingly, the present invention can perform processing on a second ordered store prior to completion of a first ordered store in a cache or memory. By triggering storage of the second ordered store based on the KRESP instead of waiting for the first data store to be fully completed, storage operations are increased because data stores can be handled in parallel while still adhering to an ordering requirement.

The embodiments of the present invention disclosed herein can also store a coherency of multiple lines in parallel and perform actual stores into a cache simultaneously. Accordingly, the present invention can improve overlapping IO stores by a duration of two fabric hops and an associated on-drawer latency by performing the actual data store in cache or in memory should a cache miss occur.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for maintaining ordered memory access with parallel access data streams associated with a distributed shared memory system, the method comprising:

performing, by a first cache, a key check, the key check being associated with a first ordered data store;

signaling, by a first memory node, that the first memory node is ready to begin pipelining of a second ordered data store into the first memory node to an input/output (I/O) controller;

returning a key response to the first cache indicating that the pipelining of the second ordered data store is ready to proceed;

sending, by the first memory node, a ready signal indicating that the first memory node is ready to continue pipelining of the second ordered data store into the first memory node to the I/O controller, wherein the ready signal is triggered by receipt of the key response;

performing, by the first memory node, a coherency check on the first ordered data store for a first ordered data store request received from the I/O controller; and detecting, by the first memory node, whether a delay condition exists in the distributed shared memory system with respect to the coherency check of the first ordered data store.

2. The computer-implemented method of claim 1, wherein the key response is returned to the first cache prior to completing the first ordered data store.

3. The computer-implemented method of claim 1, wherein responsive to detection of the delay condition, the first memory node sends to the I/O controller a rejection signal indicating that the distributed shared memory system did not complete the first ordered data store.

4. The computer-implemented method of claim 1, wherein sending the key response and sending the ready signal indicating that the first memory node is ready to continue pipelining of the second ordered data store occur in response to a detection of an absence of the delay condition.

5. The computer-implemented method of claim 1, wherein the first ordered data store and the second ordered data store are conducted in parallel.

6. The computer-implemented method of claim 1, wherein the first ordered data store and the second ordered data store are overlapping.

7. The computer-implemented method of claim 1, wherein the first cache is a level 3 cache.

8. A computer program product, the computer program product comprising a computer readable storage medium having program instructions embodied therewith, the program instructions readable by a processing circuit to cause the processing circuit to perform a method comprising:

performing a key check, the key check being associated with a first ordered data store;

signaling that a first memory node is ready to begin pipelining of a second ordered data store into the first memory node to an input/output (I/O) controller;

returning a key response to a first cache indicating that the pipelining of the second ordered data store is ready to proceed;

sending a ready signal indicating that the first memory node is ready to continue pipelining of the second ordered data store into the first memory node to the I/O controller, wherein the ready signal is triggered by receipt of the key response;

performing a coherency check on the first ordered data store for a first ordered data store request received from the I/O controller; and detecting whether a delay condition exists in a distributed shared memory system with respect to the coherency check of the first ordered data store.

9. The computer program product of claim 8, wherein the key response is returned to the first cache prior to completing the first ordered data store.

10. The computer program product of claim 8, wherein responsive to detection of the delay condition, the first memory node sends to the I/O controller a rejection signal indicating that the distributed shared memory system did not complete the first ordered data store.

11. The computer program product of claim 8, wherein sending the key response and sending the ready signal indicating that the first memory node is ready to continue pipelining of the second ordered data store occur in response to a detection of an absence of the delay condition.

12. A computer system, comprising:
one or more nodes comprising one or more processors in communication with one or more types of memory, the one or more types of memory being at least a plurality of caches;
one or more input/output controllers; and
one or more fabrics;
wherein the computer system is configured to:
perform a key check, the key check being associated with a first ordered data store;
signal that a first memory node is ready to begin pipelining of a second ordered data store into the first memory node to an input/output (I/O) controller;
return a key response to the first cache indicating that the pipelining of the second ordered data store is ready to proceed;
send a ready signal indicating that the first memory node is ready to continue pipelining of the second ordered data store into the first memory node to the I/O controller, wherein the ready signal is triggered by receipt of the key response;
perform a coherency check on the first ordered data store for a first ordered data store request received from the input/output (I/O) controller; and
detect whether a delay condition exists in a distributed shared memory system with respect to the coherency check of the first ordered data store.

13. The computer system of claim 12, wherein the key response is returned to a first cache prior to completing the first ordered data store.

14. The computer system of claim 12, wherein responsive to detection of the delay condition, the first memory node sends to the I/O controller a rejection signal indicating that the distributed shared memory system did not complete the first ordered data store.

15. The computer system of claim 12, wherein sending the key response and sending the ready signal indicating that the first memory node is ready to continue pipelining of the second ordered data store occur in response to a detection of an absence of the delay condition.

16. The computer system of claim 12, wherein the first ordered data store and the second ordered data store are conducted in parallel.

17. The computer system of claim 12, wherein the first ordered data store and the second ordered data store are overlapping.

* * * * *